(12) United States Patent
Xu et al.

(10) Patent No.: US 11,700,873 B2
(45) Date of Patent: Jul. 18, 2023

(54) AUTOMATIC PEELING AND SPLITTING DEVICE FOR CITRUS FRUITS

(71) Applicant: Institute of Facility Agriculture, Guangdong Academy of Agricultural Science, Guangdong (CN)

(72) Inventors: Sai Xu, Guangdong (CN); Huazhong Lu, Guangdong (CN); Changyuan Zhang, Guangdong (CN); Xin Liang, Guangdong (CN)

( * ) Notice: Subject to any disclaimer, the term of this patent is extended or adjusted under 35 U.S.C. 154(b) by 0 days.

(21) Appl. No.: 17/970,583

(22) Filed: Oct. 21, 2022

(65) Prior Publication Data

US 2023/0127308 A1 Apr. 27, 2023

(30) Foreign Application Priority Data

Oct. 23, 2021 (CN) .......................... 202111236854.6

(51) Int. Cl.
*A23N 7/02* (2006.01)
*A47J 17/16* (2006.01)
*A23N 7/10* (2006.01)

(52) U.S. Cl.
CPC ............... *A23N 7/026* (2013.01); *A23N 7/02* (2013.01); *A47J 17/16* (2013.01); *A23N 7/10* (2013.01)

(58) Field of Classification Search
CPC ........... A47J 17/14; A47J 17/16; A23N 7/002; A23N 7/00; A23N 7/02; A23N 7/026; A23N 7/10; A23N 15/02
USPC .......................... 99/588, 591, 593, 594, 596
See application file for complete search history.

(56) References Cited

U.S. PATENT DOCUMENTS 2,569,207 A * 9/1951 Waters .................... A23N 4/14
99/590
3,583,457 A * 6/1971 Vadas .................... A23N 7/002
426/482

FOREIGN PATENT DOCUMENTS

| CN | 105105292 A | 12/2015 |
| CN | 105982499 A | 10/2016 |
| CN | 107307435 A | 11/2017 |
| CN | 107744154 A | 3/2018 |
| CN | 208624565 U | 3/2019 |
| CN | 111248713 A | 6/2020 |
| CN | 212117830 U | 12/2020 |
| CN | 112369895 A | 2/2021 |

(Continued)

OTHER PUBLICATIONS

1st Office Action of counterpart Chinese Patent Application No. 202111236854.6 dated Jun. 13, 2022.

(Continued)

*Primary Examiner* — Reginald Alexander

(57) ABSTRACT

An automatic peeling and splitting device for citrus fruits includes a bracket, a pomelo fixing module, and a pomelo peeling module arranged on the bracket. The pomelo fixing module includes a cylinder arranged on an upper part of the bracket, a fixed block arranged on a power output end of the cylinder, and a motor arranged on the fixed block, the power output end of the motor is connected with a rotation shaft, an end of the rotation shaft is sleeved with an air sac, and the end of the rotation shaft is further hinged with a plurality of arc baffles, a concave member of the arc baffle is bonded to a surface of the air sac, an outer convex edge of the arc baffle faces outside of the air sac; the rotation shaft and the power output end of the cylinder are both extended vertically downward.

6 Claims, 5 Drawing Sheets

(56) References Cited

FOREIGN PATENT DOCUMENTS

| CN | 112385868 A | 2/2021 |
|---|---|---|
| JP | 2011193749 A | 10/2011 |
| JP | 2016021882 A | 2/2016 |

OTHER PUBLICATIONS

Notice of Allowance of counterpart Chinese Patent Application No. 202111236854.6 dated Jul. 25, 2022.

* cited by examiner

AUTOMATIC PEELING AND SPLITTING DEVICE FOR CITRUS FRUITS

CROSS REFERENCE TO RELATED APPLICATIONS

The present application claims the benefit of Chinese Patent Application No. 202111236854.6 filed on Oct. 23, 2021, the contents of which are incorporated herein by reference in their entirety.

FIELD

The subject matter herein generally relates to technology of fruit processing equipment, and particularly to an automatic peeling and splitting device for citrus fruits.

BACKGROUND

Pomelo is the fruit of the citrus plant of the Rutaceae family, and is popular. A diameter of the pomelo is large, the pulp of the pomelo is fresh and sweet, but the thickness of the pomelo peel is large, it is difficult and time-consuming to peel manually. In order to improve the peeling efficiency, most processing personnel currently use the peeling device for semi-automatic or fully automatic peeling processing.

The specific structure of the peeling device refers a Chinese patent application with a number of 201510095804.9, which discloses a pomelo peeler, the pomelo peeler includes a main body, an arched elastic arm connecting both ends of the main body, and a swing arm, A positioning pin is upward arranged on the top of the arched elastic arm, a bolt is inserted through the positioning pin, both ends of the swing arm are respectively connected with the positioning pin and the main body, and can rotate around the main body 360 degrees, the swing arm is provided with a longitudinal slot, and a sharpening knife that can slide along the longitudinal slot.

In this scheme, the pomelo is placed on the main body between two arched elastic arms, the bolt is tightened to fix the pomelo, the handle of the paring knife is held, and the paring knife is pulled from top to bottom to cut the pomelo peel, and the pomelo peel is cut one by one by rotating the swing arm. This scheme adopts the bolt to fix the pomelo, which can provide sufficient tightening force compared with the method of turning the pomelo by hand, but cannot apply high-speed rotation.

A Chinese patent application with a number of 202011385813.9 discloses a pomelo peeler, which includes a rack, a first telescopic mechanism, up-down translation mechanisms, a first electric telescopic rod, and a cutter, the rack is connected with a rotation table, a vertical upward positioning pin is arranged on the rotation table, the first telescopic mechanism is connected with the positioning pin, the rotation table defines a through hole, the first telescopic mechanism can drive the positioning pin to extend from or retract into the rotation table along the through hole, and the two up-down translation mechanisms are arranged along the axial direction of the rotation table, and symmetrically arranged on both sides of the rotation table, the lower ends of the two up-down translation mechanisms are respectively connected with the lower end surface of the rack, The up-down translation mechanisms can reciprocate up and down in the vertical direction, the first electric telescopic rod is arranged in the axial direction of the rotation table, a fixed end is connected with the up-down translation mechanisms, and can reciprocate up and down along the vertical direction with the up-down translation mechanisms, the cutter is fixedly connected with a telescopic end of the first electric telescopic rod.

This scheme adopts the rotation of the rotation table to drive the pomelo on the rotation table to rotate, the pressure plate presses the pomelo on the rotation table, and positions the pomelo in the axial direction, the rotation table is provided with the positioning pin that can move back and forth, the positioning pin is inserted into the pomelo body, and the positions the pomelo body in the radial direction, during the rotation, there will be relative rotation among the pomelo, the positioning pin, and the rotation table, which affects the quality and efficiency of peeling.

A Chinese patent application with a number of 202010071011.4 discloses a pomelo peeling device, which includes a base, a cutting mechanism is arranged on the top of the base, and the interior of the cutting mechanism includes a first fixing plate, the first fixing plate is fixed on a side of the base, a support rod is fixed on the top of the first fixing plate, and a stop block is fixed on the surface of the support rod, one end of the stop block is connected with a first spring, and the other end of the first spring is connected with a first baffle, one side of the first baffle is connected with a top block, and one end of the top block is welded with a first cutting knife.

In this scheme, the pomelo is placed between the load-bearing plate and the splint, the load-bearing plate and the splint are respectively provided with a thimble, the thimbles symmetrically arranged at the edge, and the thimbles are inserted into the pomelo body, which can avoid the relative rotation among the pomelo body, the load-bearing plate, and the splint, the fastening effect is strong, however, the pulp may be damaged.

Therefore, the present disclosure can solve the following problem, how to realize that the peeling device fastens, cut, and separate the rotating pomelo, and to improve the peeling quality and efficiency of the pomelo without damaging the pulp.

SUMMARY

A purpose of the present disclosure is to provide an automatic peeling and splitting device for citrus fruits.

The automatic peeling and splitting device for citrus fruits, includes:

a bracket;

a pomelo fixing module arranged on the bracket and including a cylinder arranged on an upper part of the bracket, a fixed block arranged on a power output end of the cylinder, and a motor arranged on the fixed block, the power output end of the motor is connected with a rotation shaft, an end of the rotation shaft is sleeved with an air sac, and the end of the rotation shaft is further hinged with a plurality of arc baffles, a concave member of the arc baffle is bonded to a surface of the air sac, an outer convex edge of the arc baffle faces outside of the air sac; the rotation shaft and the power output end of the cylinder are both extended vertically downward; and a pomelo peeling module arranged on the bracket and comprising at least one blade module arranged on the bracket, the blade module comprises a lifting unit, a cross rod arranged on the lifting unit, a blade arranged on the cross rod, an extending direction of an edge of the blade is perpendicular to a rotating direction of the rotation shaft, a translation cylinder for driving the blade to move back and forth radially along the rotation shaft is arranged between the cross rod and the blade, the cross rod is fixedly connected with the translation cylinder.

In the automatic peeling and splitting device for citrus fruits, the pomelo peeling module includes two blade modules, and two blade modules are arranged opposite each other, the blade of one blade module is used to peel a skin layer of a pomelo peel, and the blade of the other blade module is used to peel a spongy layer of the pomelo peel, a distance between the blade for peeling the skin layer of the pomelo peel and pulp of the pomelo is greater than a distance between the blade for peeling the spongy layer of the pomelo peel and the pulp of the pomelo.

In the automatic peeling and splitting device for citrus fruits, a top of the bracket is provided with a horizontal moving module, and the cylinder is arranged on the horizontal moving module; a hopper is arranged below the bracket, a support column is arranged in the hopper, and the support column is located right below a moving path of the horizontal moving module.

In the automatic peeling and splitting device for citrus fruits, a support base is provided on a top of the support column, an upper surface of the support base is an inward concave member, and the support base is connected with the support column through a spindle that is vertically arranged.

In the automatic peeling and splitting device for citrus fruits, a conveying chain plate is provided below the bracket, and a supporting frame for supporting an inverted pomelo is provided on the conveying chain plate, an interior of the supporting frame is an inward concave portion, an end of the moving path of the horizontal moving module is located right above the conveyor chain plate.

In the automatic peeling and splitting device for citrus fruits, a skin layer hopper and a spongy layer hopper are provided below the bracket, and the skin layer hopper and the spongy layer hopper are located below a corresponding blade module respectively.

BRIEF DESCRIPTION OF THE DRAWINGS

In order to clearly explain technical solutions of embodiments of the present disclosure or in the related art, drawings used in the description of the embodiments or the related art are briefly described below. Obviously, the drawings as described below are merely some embodiments of the present disclosure. Based on these drawings, other drawings can be obtained by those skilled in the art without paying creative efforts.

DETAILED DESCRIPTION

Figure 1:
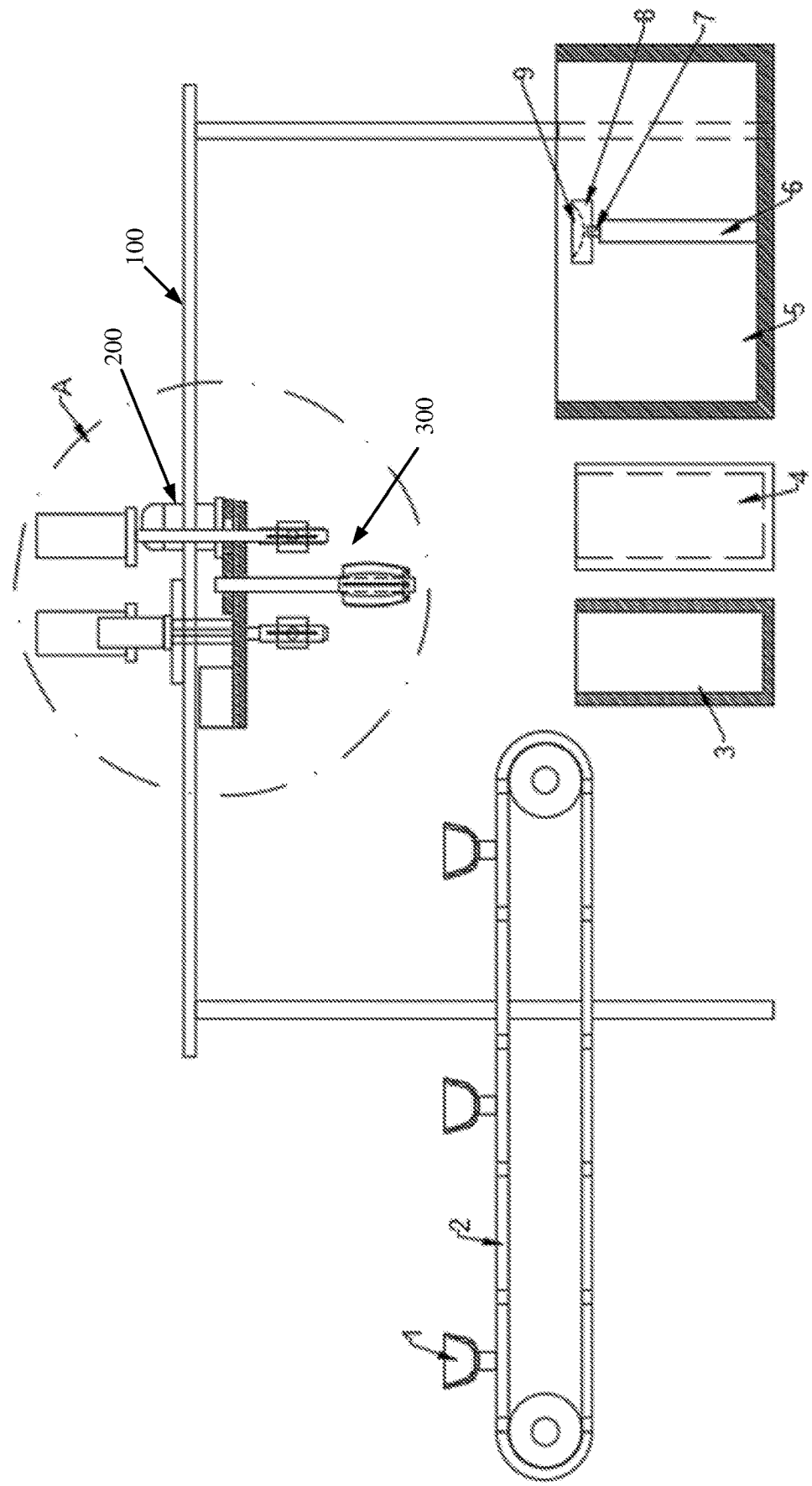
FIG. 1 is a front view of an embodiment 1 of an automatic peeling and splitting device for citrus fruits according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may have presented methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The words "first", "second" and the like used in the embodiments of the present disclosure do not represent any order, quantity or importance, but are merely used to distinguish among different components. The words "include", "contain" or the like mean that elements or articles appearing before the words cover elements or articles listed after the words and their equivalents, without excluding other elements or articles. The words "connect", "link" or the like are not limited to physical or mechanical connection, but may include electrical connection, whether direct or indirect.

Embodiment 1

Figure 2:
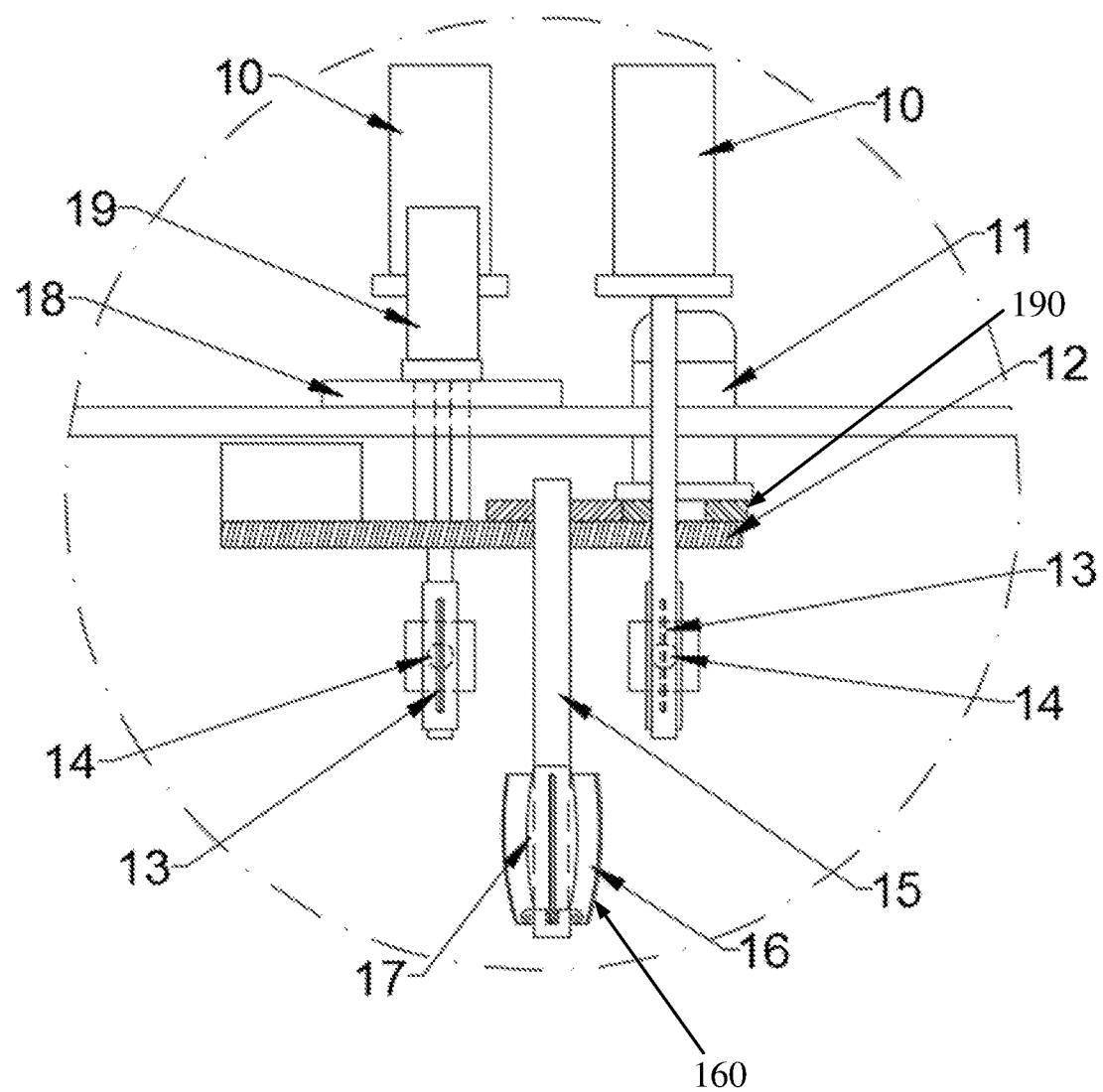
FIG. 2 is a partial enlarged view of an area A in FIG. 1 according to the present disclosure.
Figure 3:
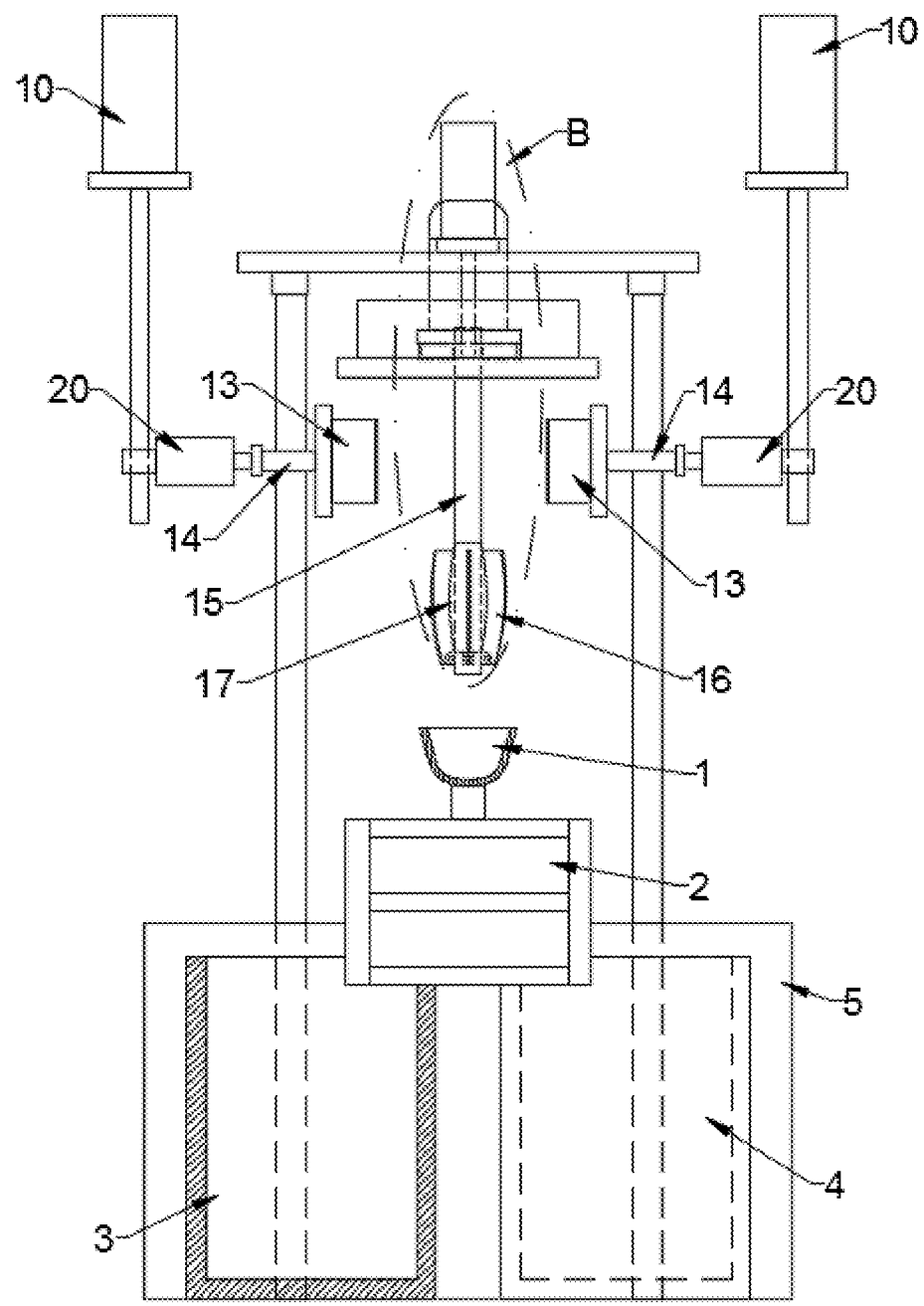
FIG. 3 is a side view of the embodiment 1 of an automatic peeling and splitting device for citrus fruits according to the present disclosure.
Figure 4:
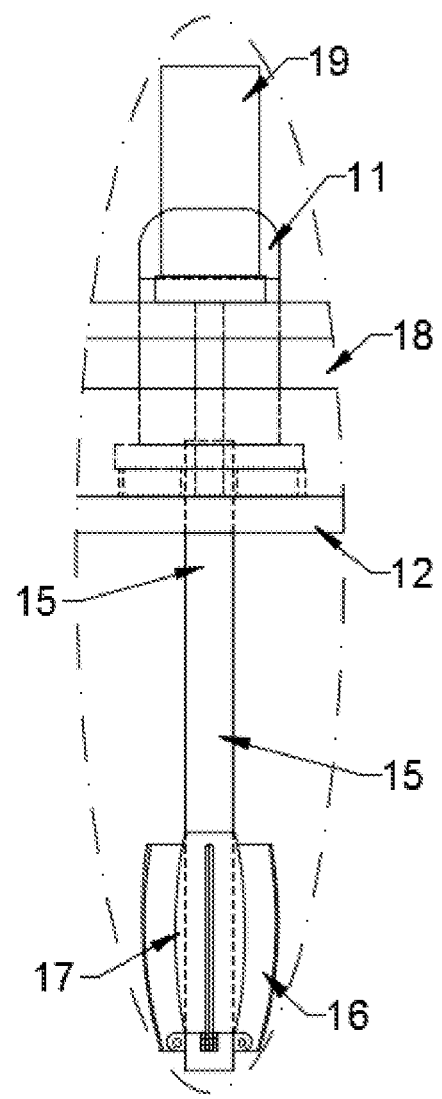
FIG. 4 is a partial enlarged view of an area B in FIG. 3 according to the present disclosure.
Figure 5:
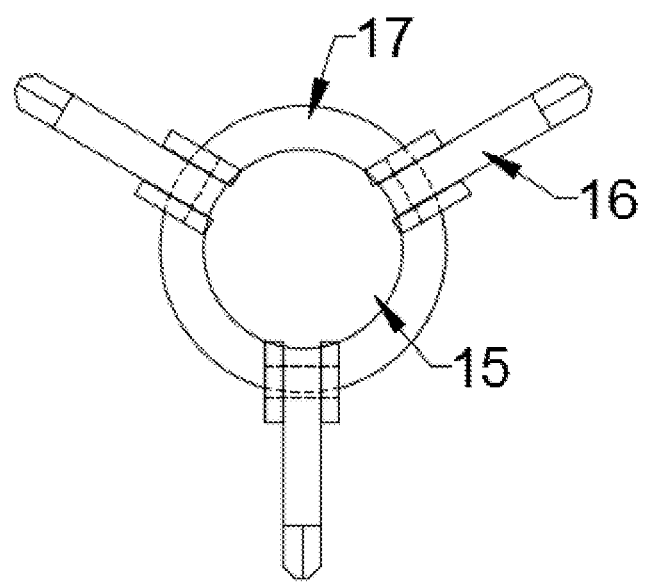
FIG. 5 is a side view of the embodiment 1 of a rotation shaft, an air sac, and an arc baffle according to the present disclosure.

Referring to FIGS. 1-5, an automatic peeling and splitting device for citrus fruits is illustrated, the automatic peeling and splitting device for citrus fruits including a bracket 100, a pomelo fixing module 200, and a pomelo peeling module 300 arranged on the bracket 100.

The pomelo fixing module includes a cylinder 19 arranged on an upper part of the bracket, a fixed block 12 arranged on a power output end 190 of the cylinder 19, and a motor 11 arranged on the fixed block 12, the power output end of the motor 11 is connected with a rotation shaft 15, an end of the rotation shaft 15 is sleeved with an air sac 17, and the end of the rotation shaft 15 is further hinged with a number of arc baffles 16, a concave member 9 of the arc baffle 16 is bonded to a surface of the air sac 17, an outer convex edge 160 of the arc baffle 16 faces outside of the air sac 17; the rotation shaft 15 and the power output end of the cylinder 19 are both extended vertically downward.

The pomelo peeling module includes at least one blade module arranged on the bracket; the blade module includes a lifting unit 10, a cross rod 14 arranged on the lifting unit 10, a blade 13 arranged on the cross rod 14, an extending direction of an edge of the blade 13 is perpendicular to a rotating direction of the rotation shaft 15.

Through cooperation of the pomelo fixing module and the pomelo peeling module, automatic peeling can be completed; a bottom of the pomelo is peeled off, there is a cavity in the middle of the pomelo body, the cavity is aligned with the rotation shaft 15, the cylinder 19 drives the rotation shaft 15 to descend and insert into the cavity, the air sac 17 on the end of the rotation shaft 15 is located inside the pomelo body, the air sac 17 is inflated, part of an outer surface of the air sac 17 closely contacts with pulp of the pomelo, and the arc baffle 16 on the outer surface of the air sac 17 swings along a radial direction of the pomelo body, and embeds between pomelo segments, thus, the pomelo is firmly fixed on the rotation shaft 15; the blade 13 is located on a horizontal side of the pomelo, the edge of the blade 13 is located in an outline of a horizontal projection of the pomelo body, the lifting unit 10 drives the blade 13 to rise and descend, and insert into the pomelo peel, after the blade is inserted 13 into the pomelo peel, the rotation shaft 15 drives the pomelo to rotate, the lifting unit 10 drives the blade 13 to gradually descend or rise, and complete peeling, which realizes that the peeling device can fasten, cut, and separate the rotating pomelo without damaging the pulp, and improves the peeling quality and efficiency of pomelo.

In order to prevent the arc baffles 16 from being embedded in the pulp, the number of the arc baffles 16 is 3 to 4, so as to prevent the arc baffles 16 from being too dense and damaging the pulp.

In one embodiment, the lifting unit 10 can be a lifting cylinder. In other embodiments, the lifting unit 10 can also be replaced by screw drive, chain drive, etc., which is not limited.

As a further improvement, a translation cylinder 20 for driving the blade to move back and forth radially along the rotation shaft 15 is arranged between the cross rod 14 and the blade 13; the cross rod 14 is fixedly connected with the translation cylinder 20.

An outer contour of the pomelo is a curved surface, an power output end of the translation cylinder 20 controls the blade 13 to move forward and backward along the radial direction of the rotation shaft by being elongated and shortened, thus, the edge of the blade 13 is always located in the pomelo peel, thereby avoiding the influence of the structure of curved surface, the peeling is more efficient, the peeling quality is improved. In other embodiments, the solution that the horizontal position of the blade is controlled by the translation cylinder 20 can also be implemented by using a torsion spring to peel the pomelo by closely contacting the pomelo peel in the prior art.

In practical applications, the number of the blade modules is 2, and the two blade modules are arranged opposite each other. The blade 13 of one blade module is used to peel a skin layer of the pomelo peel, and the blade 13 of the other blade module is used to peel a spongy layer of the pomelo peel. A distance between the blade 13 for peeling the skin layer of the pomelo peel and the pulp of pomelo is greater than a distance between the blade 13 for peeling the spongy layer of the pomelo peel and the pulp of pomelo.

The two blade modules adopts two different blades 13 to cut the skin layer and the spongy layer of the pomelo respectively, which not only prolongs the service life of the single blade 13, but also separates the skin layer and the spongy layer of the pomelo for recycling respectively; for example, two blades 13 are located on the top of the pomelo, the lifting unit 10 of one blade module drives the blade 13 to descend and cut the skin layer, and then the lifting unit 10 of the other blade module drives the blade 13 to descend and cut the spongy layer, the two descend forms a time difference, the separation of the skin layer and the spongy layer is completed.

As a further improvement, the top of the bracket is further provided with a horizontal moving module 18, and the cylinder 19 is arranged on the horizontal moving module 18; a hopper 5 is further arranged below the bracket, a support column 6 is arranged in the hopper 5, the support column 6 is located right below a moving path of the horizontal moving module 18.

After cutting, the blade 13 returns to an original position, the horizontal moving module 18 drives the fixed block 12 to move, the fixed block 12 drives the rotation shaft 15 to move, and moves to the top of the hopper 5, the cylinder 19 is extended, and the pomelo is pressed down on the support column 6 of the hopper 5, the air sac 17 continues to inflate, and the arc baffle 16 is embedded between the pomelo segments more deeply, at this time, the skin layer of the head part of the pomelo is still pressed against the support column 6, the pulp of the pomelo is stretched by the air sac 17 and the arc baffle 16, the rotation shaft 15 starts to rotate, and drives the pomelo to rotate at a high speed, under the action of centrifugal force, the pulp of the pomelo is thrown out from the pomelo body one segment by one segment, and is separated from the head part of the pomelo, and the pulp that has been thrown out falls into the hopper 5, thus, the separation of the pulp is completed.

Preferably, a support base 8 is provided on the top of the support column 6, an upper surface of the support base 8 is an inward concave member 9, and the support base 8 is connected with the support column 6 through a rotation shaft 7 that is vertically arranged.

Since a shape of the head part of the pomelo is an arc-shaped curved surface, the support base 8 is arranged on the support column 6, and the head part of the pomelo is fitted with the concave member 9 on the support base 8, which increases the positioning effect of the support base 8, the support base 8 is connected with the support column 6 through the rotation shaft 7, that is, the support base 8 is rotatably cooperated with the support column 6 through the rotation shaft 7, and the support base 8 rotates with the pomelo, so as to avoid the relative rotation between the support base 8 and the pomelo, and the frictional resistance is thus reduced.

As a further improvement, a conveying chain plate 2 is further provided below the bracket, and a supporting frame 1 for supporting the inverted pomelo is provided on the conveying chain plate 2, an interior of the supporting frame 1 is an inward concave portion; an end of the moving path of the horizontal moving module 18 is located right above the conveyor chain plate 2.

A feeding process of the pomelo includes: the pomelo whose bottom has been cut off is placed on the support frame 1, and the inward concave portion on the support frame 1 matches the head part of the pomelo, which is convenient for the support frame 1 to locate the pomelo, the conveyor chain plate 2 drives the support frame 1 to move to right below the rotation shaft 15.

The horizontal moving module 18 includes a guide rail, a sliding plate that is slidingly cooperated with the guide rail, and a servo motor module that drives a sliding board to move back and forth, the cylinder 19 is arranged on the sliding plate, and two ends of the guide rail is extended to right above the support frame 1 and the support column 6 respectively.

In another embodiment, a skin layer hopper 3 and a spongy layer hopper 4 are further provided below the bracket, and the skin layer hopper 3 and the spongy layer hopper 4 are located below the corresponding blade module respectively.

Under the cutting of different blades 13, the skin layer and the spongy layer fall into the skin layer hopper 3 and the spongy layer hopper 4 respectively, which is convenient for sorting and recycling, and can be recycled according to characteristics of the pomelo peel.

Compared with prior art, the beneficial effects of the present disclosure are as follows: through the cooperation of the pomelo fixing module and the pomelo peeling module, the automatic peeling can be completed; a bottom of the pomelo is peeled off, there is a cavity in the middle of the pomelo body, the cavity is aligned with the rotation shaft 15, the cylinder 19 drives the rotation shaft 15 to descend and insert into the cavity, the air sac 17 on the end of the rotation shaft 15 is located inside the pomelo body, the air sac 17 is inflated, part of an outer surface of the air sac 17 closely contacts with pulp of the pomelo, and the arc baffle 16 on the outer surface of the air sac 17 swings along a radial direction of the pomelo body, and embeds between pomelo segments, thus, the pomelo is firmly fixed on the rotation shaft 15; the blade 13 is located on a horizontal side of the pomelo, the edge of the blade 13 is located in an outline of a horizontal projection of the pomelo body, the lifting unit 10 drives the blade 13 to rise and descend, and insert into the pomelo peel, after the blade is inserted 13 into the pomelo peel, the rotation shaft 15 drives the pomelo to rotate, the lifting unit 10 drives the blade 13 to gradually descend or rise, and complete peeling, which realizes that the peeling device can fasten, cut, and separate the rotating pomelo without damaging the pulp, and improves the peeling quality and efficiency of pomelo, at the same time, when the peeling of the pomelo is completed, the air sac 17 can further be controlled to expand, through the rotation of the rotation shaft 15, the pomelo segments are spilt, thus, the effect of splitting is achieved.

The above embodiments, which are described in detail, are merely some implementations of the present disclosure, but they should not be construed to limit the scope of the present disclosure. It should be pointed out that, various modifications and improvements can be made by those skilled in the art without departing from the concept of the present disclosure. These modifications and improvements shall be encompassed by the protection scope of the present disclosure as defined by the appended claims.

What is claimed is:

1. An automatic peeling and splitting device for citrus fruits, comprising:
    a bracket;
    a pomelo fixing module arranged on the bracket and comprising a cylinder arranged on an upper part of the bracket, a fixed block arranged on a power output end of the cylinder, and a motor arranged on the fixed block, wherein the power output end of the motor is connected with a rotation shaft, an end of the rotation shaft is sleeved with an air sac, and the end of the rotation shaft is further hinged with a plurality of arc baffles, a concave member of the arc baffle is bonded to a surface of the air sac, an outer convex edge of the arc baffle faces outside of the air sac; the rotation shaft and the power output end of the cylinder are both extended vertically downward; and
    a pomelo peeling module arranged on the bracket and comprising at least one blade module arranged on the bracket, wherein the blade module comprises a lifting unit, a cross rod arranged on the lifting unit, a blade arranged on the cross rod, an extending direction of an edge of the blade is perpendicular to a rotating direction of the rotation shaft, a translation cylinder for driving the blade to move back and forth radially along the rotation shaft is arranged between the cross rod and the blade, the cross rod is fixedly connected with the translation cylinder.

2. The automatic peeling and splitting device for citrus fruits according to claim 1, wherein pomelo peeling module comprises two blade modules, and two blade modules are arranged opposite each other, the blade of one blade module is used to peel a skin layer of a pomelo peel, and the blade of the other blade module is used to peel a spongy layer of the pomelo peel, a distance between the blade for peeling the skin layer of the pomelo peel and pulp of the pomelo is greater than a distance between the blade for peeling the spongy layer of the pomelo peel and the pulp of the pomelo.

3. The automatic peeling and splitting device for citrus fruits according to claim 2, wherein a top of the bracket is provided with a horizontal moving module, and the cylinder is arranged on the horizontal moving module; a hopper is arranged below the bracket, a support column is arranged in the hopper, and the support column is located right below a moving path of the horizontal moving module.

4. The automatic peeling and splitting device for citrus fruits according to claim 3, wherein a support base is provided on a top of the support column, an upper surface of the support base is an inward concave member, and the support base is connected with the support column through a spindle that is vertically arranged.

5. The automatic peeling and splitting device for citrus fruits according to claim 3, wherein a conveying chain plate is provided below the bracket, and a supporting frame for supporting an inverted pomelo is provided on the conveying chain plate, an interior of the supporting frame is an inward concave portion, an end of the moving path of the horizontal moving module is located right above the conveyor chain plate.

6. The automatic peeling and splitting device for citrus fruits according to claim 2, wherein a skin layer hopper and a spongy layer hopper are provided below the bracket, and the skin layer hopper and the spongy layer hopper are located below a corresponding blade module respectively.

* * * * *